United States Patent [19]

Kozuma et al.

[11] Patent Number: 5,061,578

[45] Date of Patent: Oct. 29, 1991

[54] ELECTROLYTE CIRCULATION TYPE SECONDARY BATTERY OPERATING METHOD

[75] Inventors: Ichiro Kozuma; Toshinobu Fujii, both of Tokyo, Japan

[73] Assignee: Kabushiki Kaisha Meidensha, Tokyo, Japan

[21] Appl. No.: 922,706

[22] Filed: Oct. 24, 1986

[30] Foreign Application Priority Data

Oct. 31, 1985 [JP] Japan .................. 60-242798

[51] Int. Cl.$^5$ .......................... H01M 14/00
[52] U.S. Cl. ......................... 429/3; 429/51; 429/61; 136/291
[58] Field of Search ............. 136/291, 248; 429/3, 429/9, 14, 15, 22, 23, 21, 70, 51, 61

[56] References Cited

U.S. PATENT DOCUMENTS

| | | | |
|---|---|---|---|
| 3,850,695 | 11/1974 | Keller et al. | 429/23 |
| 3,996,064 | 12/1976 | Thaller | 429/23 |
| 4,326,013 | 4/1982 | Jacobi et al. | 136/248 |
| 4,418,128 | 11/1983 | Fujii | 429/70 |
| 4,510,218 | 4/1985 | Ando et al. | 429/101 |
| 4,517,258 | 5/1985 | Bronoel | 429/21 |
| 4,663,251 | 5/1987 | Sasaki et al. | 429/70 |

Primary Examiner—John F. Niebling
Assistant Examiner—Steven P. Marquis
Attorney, Agent, or Firm—Bachman & LaPointe

[57] ABSTRACT

A method of operating a secondary battery including a stack of secondary cells operable, in the presence of electrolytes, in a charge mode charging electrical power from a source of electrical power and in a discharge mode discharging the charge electrical power from the secondary cell. A part of the electrical power from the electrical power source is used intermittently in the charge mode to provide intermittent circulation of the electrolytes through the secondary cell. The secondary cell continues to operate in the charge mode with the electrolytes residual in the secondary cell after each interruption of circulation of the electrolytes. A part of the electrical power charged in the secondary cell is used intermittently in the discharge mode to provide intermittent circulation of the electrolytes through the secondary cell. The secondary cell continues to operate in the discharge mode with the electrolyes residual in the secondary cell after each interruption of circulation of the electrolytes.

7 Claims, 1 Drawing Sheet

ELECTROLYTE CIRCULATION TYPE SECONDARY BATTERY OPERATING METHOD

BACKGROUND OF THE INVENTION

This invention relates to a method of operating an electrolyte circulation type battery stack of secondary cells operable in a charge mode storing electrical power from a source of electrical power and in a discharge mode discharging the stored electrical power from the secondary battery stack to an electrical load with electrolytes circulating to each secondary cell.

Solar batteries have been developed to convert the sunlight into electrical power. Such solar batteries have a great advantageous potential of supplying electrical power in islets, secluded places, and other areas where no commercial electrical power is available. It is desired to connect a solar battery to a secondary battery so as to store a dump power in daytimes during which the sunlight is sufficient to allow the solar battery to generate electrical power for use in supplying electrical power in night or times such as cloudy or rainy days during which the sunlight is too weak to allow the solar battery to generate electrical power. For this purpose, it is the current practice to connect a lead acid or alkaline secondary battery to a solar battery. However, lead acid or alkaline secondary batteries are not satisfactory in view of size and cost considerations, although they reach completion.

In order to provide a solution for the size and cost problems, it has been proposed to use an electrolyte circulation type secondary battery, such as a zinc-bromine, zinc-chlorine, or redox-flow battery, which operates in charge and discharge modes with electrolytes circulating in the battery. However, such an electrolyte circulation type secondary battery requires an additional source of electrical power to drive electric pumps to circulate the electrolytes. This requirement creates a serious problem in using such a solar battery system in areas where no commercial electrical power is available.

SUMMARY OF THE INVENTION

There is provided, in accordance with the invention, a method of operating a battery stack of secondary cells each operable, in the presence of electrolytes, in a charge mode charging electrical power from a source of electrical power and in a discharge mode discharging the charged electrical power from each the secondary cell. A part of the electrical power from the electrical power source is used intermittently in the charge mode to provide intermittent circulation of the electrolytes through each of the secondary cell. Each the secondary cells continues to operate in, the charge mode with the electrolytes residual in each of the secondary cells after each interruption of circulation of the electrolytes. A part of the electrical power charged in each of the secondary cells is used intermittently in the discharge mode to provide intermittent circulation of the electrolytes through each of the secondary cells. Each of the secondary cells continues to operate in the discharge mode with the electrolytes residual in each of the secondary cells after each interruption of circulation of the electrolytes.

Therefore, the method of the invention can operate the electrolyte circulation type secondary battery with no need for an additional source of electrical power circulating the electrolytes.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
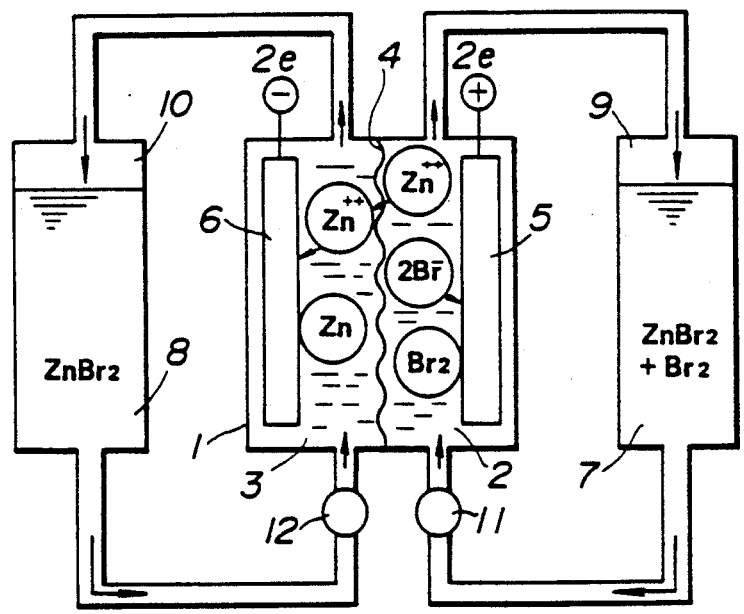
FIGS. 1 is a schematic diagram showing one example conventional electrolyte circulation type secondary battery.

For a better understanding of the inventive method, reference is made to FIG. 1 in which one example of electrolyte type secondary batteries which can be used with the invention is schematically illustrated.

A secondary cell, generally designated by the numeral 1, includes positive and negative electrode chambers 2 and 3 divided by a separation membrane 4 which provides an electrochemical separation betweeen the positive and negative electrode chambers. An positive electrode 5 is placed in the positive electrode chamber 2. A negative electrode 6 is placed in the negative electrode chamber 3. The positive and negative electrodes are electrically connected respectively to positive and negative terminals for connection to a solar battery and an electrical load through a suitable change-over switch. The positive electrode chamber 2 has inlet and outlet ports connected with each other through a circulation line having therein a positive electrolyte storage tank 9 filled with a positive electrolyte 7 which is indicated as $ZnBr_2 + Br_2$. An electric pump 11 is provided in the positive electrolyte circulation line. The electric pump 11 is operable to circulate the positive electrolyte 7 from the positive electrolyte storage tank 9 into the positive electrode chamber 2 and from the positive electrode chamber 2 into the positive electrolyte storage tank 9. Similarly, the negative electrode chamber 3 has inlet and outlet ports connected through another circulation line having therein a negative electrolyte storage tank 10 filled with a negative electrolyte 8 which is indicated as $ZnBr_2$. An electric pump 12 is provided in the negative electrolyte circulation line. The electric pump 12 is operable to circulate the negative electrolyte 8 from the negative electrolyte storage tank 10 into the negative electrode chamber 3 and from the negative electrode chamber 3 into the negative electrolyte storage tank 10.

To charge the secondary battery with electrical power, an electrical power source such as a solar battery may be connected across the positive and negative terminals of the secondary cell 1 with the electric pumps 11 and 12 being driven to circulate the positive and negative electrolytes 7 and 8 through the positive and negative electrode chambers 2 and 3 in the directions, as indicated by the arrows of FIG. 1, respectively. During the charging mode, an oxidation reaction is carried out, as $2Br^- \rightarrow Br_2 + 2e^-$, on the positive electrode 5 and a reduction reaction is carried out, as $Zn^{++} + 2e^- \rightarrow Zn$, on the negative electrode 6. The resulting bromine molecules are mixed with the positive electrolyte 7. A small percentage of the bromine molecules is dissolved in the positive electrolyte 7 and a great percentage of the bromine molecules reacts with a bromine complexing agent to produce a bromine complex in the positive electrolyte 7. The resulting bromine complex is precipitated. The precipitated bromine complex flows into the electrolyte tank 9 along with the circulating electrolyte and it is collected on the bottom thereof. This is described in greater detail in U.S. Application No. 804,433 filed on Dec. 14, 1985, to which the present invention is also applicable. The resulting zinc is electrodeposited and electroplated on the negative electrode 6.

To discharge electrical power from the secondary battery to an electric load, the electric load may be connected across the positive and negative terminals of the secondary cell 1 with the electric pumps 11 and 12 being driven to circulate the positive and negative electrolytes 7 and 8 through the positive and negative electrode chambers 2 and 3 in the directions, as indicated by the arrows of FIG. 1, respectively. During the discharging mode, electrochemical reactions are carried out on the respective positive and negative electrodes 5 and 6 in the directions consuming the electrodeposited materials Zn and $Br_2$, these directions being opposite to those described in connection with the charging mode. That is, a reduction reaction is carried out, as $Br_2 + 2e^- \rightarrow 2Br^-$, on the positive electrode 5 and an oxidation reaction is carried out, as $Zn \rightarrow Zn^{++} + 2e^-$, on the negative electrode 6.

The manner in which the electrolyte circulation type secondary battery is operated in accordance with the invention is as follows. A constant-current control device is connected across the positive and negative terminals of the secondary cell 1, which permits a constant current flow to charge and discharge the secondary battery, although solar batteries have a characteristic of providing a constant output voltage regardless of solar irradiation energy variations. A voltage sensor is provided for measuring the secondary battery voltage across the positive and negative terminals of the secondary cell 1. The secondary battery voltage measurement provides an approximate indication of the ion concentration and thus the electric resistance of the positive and negative electrolytes in the positive and negative electrode chambers 2 and 3. In addition, the fashion of change of the sensed secondary battery voltage provides an indication as to whether the secondary battery is operating in a charge or discharge mode. The voltage sensor is connected to a control unit which makes a determination as to whether or not the secondary battery is operating in a charge or discharge mode and compares the secondary battery voltage with first and second reference values in a charge mode and with third and fourth reference values in a discharge mode.

The control unit includes a first device responsive to the secondary battery voltage (charging voltage) increasing to the first reference value in a charge mode for making a connection, permitting the secondary cell 1 to drive the electric pumps 11 and 12 so as to circulate the positive and negative electrolytes into the positive and negative electrode chambers 2 and 3, respectively. The control unit first device interrupts the connection to stop the electric pumps 11 and 12 from circulating the positive and negative electrolytes to the positive and negative electrode chambers 2 and 3 when the secondary battery voltage decreases to the second reference value less than the first reference value in the charge mode. Thereafter, the secondary battery continues to operate in the charge mode storing electrical power from the solar battery array with the positive and negative electrolytes residual in the positive and negative electrode chambers 2 and 3.

The control circuit also includes a second device responsive to the secondary battery voltage (discharging voltage) decreasing to the third reference value in a discharge mode for making a connection, permitting the secondary cell 1 to drive the electric pumps 11 and 12 so as to circulate the positive and negative electrolytes into the positive and negative electrode chambers 2 and 3, respectively. The control unit second device interrupts the connection to stop the electric pumps 11 and 12 from circulating the positive and negative electrolytes to the positive and negative electrode chambers 2 and 3 when the secondary battery voltage increases to the fourth reference value greater than the third reference value in the discharge mode. Thereafter, the secondary battery continues to operate in the discharge mode with the positive and negative electrolytes residual in the positive and negative electrode chambers 2 and 3.

It is to be understood that the electric pumps 11 and 12 are connected to the secondary cell 1 through a DC/DC converter when they include a DC motor and through a DC/AC converter if they include a AC motor. Although the secondary battery as illustrated in FIG. 1 shows only one secondary cell, nevertheless it should be understood that the secondary battery may comprise a battery stack of secondary cells connected electrically in series and/or parallel. Only one pair of electrolyte storage tanks and one pair of electric pumps are required for such applications. One example of a battery stack of secondary cells is described in U.S. Pat. No. 4,520,080.

Figure 2:
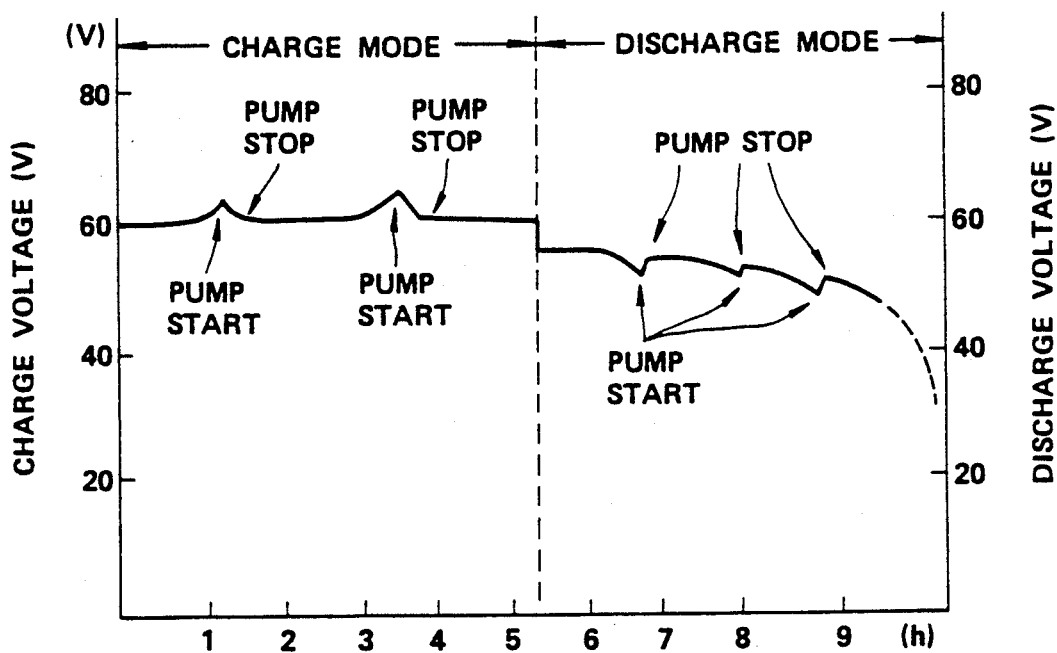
FIG. 2 is a graph of secondary battery voltage versus time used in explaining the manner in which the secondary battery is operated in accordance with the invention.

The invention will be described in greater detail by way of one example with reference to FIG. 2 which shows variations in the secondary battery voltage measured during operation in charge and discharge modes.

A solar battery array having a capacity of providing an electrical power of 5kW at maximum was connected through a constant-current control device to a 1kW (80Ah, 60V) zinc-bromine electrolyte circulation type secondary battery with electric pumps each having an AC-100V, 15W electric motor. The used secondary battery comprised a first series circuit of two stacks each including 16 secondary cells connected in series and a second series circuit of two stacks each including 16 secondary cells connected in series, the second series circuit being connected in parallel with the first series circuit. The size of the secondary battery was 1.45 m × 0.75 m × 0.87 m and the area of each electrode was 800 cm². Initially, the secondary battery was charged with the electric pumps remaining at rest. In the course of this charge mode of operation of the secondary battery, the bromine and zinc ions decreased gradually in the positive and negative electrolytes residual in the positive and negative electrode chambers and the electric resistances of the electrolytes gradually increased. This condition was indicated by a gradual increase in the secondary battery voltage (charging voltage) measured across the positive and negative terminals of the battery stack, as indicated in FIG. 2. When the secondary battery voltage increased to a first reference value, just before an abrupt secondary battery voltage increase, a part of the electrical power from the solar battery was used to drive the electric pumps so as to circulate the positive and negative electrolytes through the positive and negative electrode chambers in a manner to replace the old electrolytes with new electrolytes. This operation resulted in a reduction of the electric resistance of the positive and negative electrolytes in the positive and negative electrode chambers and thus a reduction of the secondary battery voltage, as shown in FIG. 2. When the secondary battery voltage decreased to a second reference value less than the first reference voltage, the electric pumps was separated from the solar battery to cause the electric pumps to stop from circulating the positive and negative electrolytes through the positive and negative electrode chambers. Thereafter, the secondary battery continued to operate in the charge mode with the positive and negative electrolytes left in the positive and negative electrode chambers until the secondary battery voltage increased to the first reference value. This operation was repeated, as shown in FIG. 2.

Thereafter, the secondary battery was discharged with the electric pumps remaining at rest. In the course of this discharge mode of operation of the secondary battery, the bromine and zinc ions increased gradually in the positive and negative electrolytes residual in the positive and negative electrode chambers, respectively. This condition was indicated by a graudal decrease in the secondary battery voltage (discharge voltage) measured across the positive and negative terminals of the secondary battery, as indicated in FIG. 2. The electrical conductivity of the electrolytes was at maximum and the discharge voltage was at minimum when the electrolyte ion concentration was 2.5 mol. When the secondary battery voltage decreased to a third reference value, just before an abrupt secondary battery voltage decrease, the secondary battery was connected in order to utilize a part of the charged electrical power to drive the electric pumps so as to circulate the positive and negative electrolytes through the positive and negative electrode chambers in a manner to replace the old electrolytes with new electrolytes. This operation resulted in an increase of the electric resistance of the positive and negative electrolytes in the positive and negative electrode chambers and thus an increase of the secondary battery voltage, as shown in FIG. 2. When the secondary battery voltage increased to a fourth reference value greater than the third reference value, the secondary battery was separated from the electric pumps to stop the electric pumps from circulating the positive and negative electrolytes through the positive and negative electrode chambers. Thereafter, the secondary battery continued to operate in the discharge mode with the positive and negative electrolytes residual in the positive an negative electrode chambers until the secondary battery voltage decreased to the third reference value. This operation was repeated, as shown in FIG. 2.

The invention is based o the unexpected discovery that a secondary cell can continue to operate in a charge or discharge mode for a certain time period with certain amounts of liquid electrolytes left in the secondary cell after the electric pumps are stopped from circulating the positive and negative electrolytes through the secondary cell. According to the invention, a part of the electrical power from the solar battery or from the secondary cell is used intermittently to drive the electric pumps for intermittent circulation of the liquid electrolytes to the secondary cell. The secondary cell continues to operate in a charge or discharge mode with the electrolytes residual in the secondary cell after an interruption of circulation of the electrolytes. Therefore, the invention eliminates the need for an additional source of electrical power driving the electric pumps.

What is claimed is:

1. A method of operating a secondary battery including a stack of secondary cells operable, in the presence of electrolytes, in a charge mode charging electrical power from a source of electrical power and in a discharge mode discharging the charged electrical power, and electrolyte circulating means electrically operable for circulating the electrolytes through the secondary cells, the method comprising the steps of:

in the charge mode,
providing an approximate indication of electrolyte condition by measuring a voltage across the terminals of the secondary battery;
comparing the measured secondary battery voltage with a first and second predetermined value, the second predetermined value being less than the first predetermined value;
electrically connecting the electrolyte circulating means to the electrical power source to start circulation of the electrolytes through the secondary cells when the secondary battery voltage increases to the first predetermined value;
disconnecting the electrolyte circulating means from the electrical power source to stop the electrolyte circulation when the secondary battery voltage decreases to the second predetermined value; and thereafter
while the secondary battery is operating in the charge mode, continuously repeating the above sequence of steps to intermittently circulate the electrolytes through the secondary cells;
in the discharge mode,
providing an approximate indication of electrolyte condition by measuring a voltage across the terminals of the secondary battery;
comparing the measured secondary battery voltage with a third and fourth predetermined value, the fourth predetermined value being greater than the third predetermined value;
electrically connecting the electrolyte circulating means to the secondary battery to start circulation of the electrolytes through the secondary cells when the secondary battery voltage decreases to the third predetermined value;
disconnecting the electrolyte circulating means from the secondary battery to stop the electrolyte circulation when the secondary battery voltage increases to the fourth predetermined value; and thereafter
while the secondary battery is operating in the discharge mode, continuously repeating the above sequence of steps to intermittently circulate the electrolytes through the secondary cells.

2. The method as claimed in claim 1, wherein the electrical power source is a solar battery.

3. The method as claimed in claim 1, wherein a constant current flows to and from the secondary battery in the charge and discharge modes.

4. The method as claimed in claim 1, wherein a constant current flows to and from the secondary battery in the charge and discharge modes.

5. The method as claimed in claim 1, wherein the secondary battery is a zinc-bromine battery.

6. A method of operating a secondary battery including a stack of secondary cells operable, in the presence of electrolytes, in a charge mode charging electrical power from a source of electrical power and in a discharge mode discharging the charged electrical power, and electrolyte circulating means electrically operable for circulating the electrolytes through the secondary cells, the method comprising the steps of:

in the charge mode,
electrically connecting the electrolyte circulating means to the electrical power source to start circulation of the electrolytes through the secondary cells when the secondary battery voltage as measured across positive and negative terminals of the secondary battery increases to a first predetermined value;
disconnecting the electrolyte circulating means from the electrical power source to stop the electrolyte circulation when the secondary battery voltage decreases to a second predetermined value less than the first predetermined value; and thereafter
while the secondary battery is operating in the charge mode, continuously repeating the above sequence of steps to intermittently circulate the electrolytes through the secondary cells;

in the discharge mode,
electrically connecting the electrolyte circulating means to the secondary battery to start circulation of the electrolytes through the secondary cells when the secondary battery voltage as measured across the positive and negative terminals decreases to a third predetermined value;
disconnecting the electrolyte circulating means from the secondary battery to stop the electrolyte circulation when the secondary battery voltage increases to a fourth predetermined value greater than the third predetermined value; and thereafter
while the secondary battery is operating in the discharge mode, continuously repeating the above sequence of steps to intermittently circulate the electrolytes through the secondary cells.

7. The method as claimed in claim 6, wherein the secondary battery is a zinc-bromine battery.

* * * * *